March 24, 1970 C. VALFRÉ 3,503,002

TRANSISTOR NEGATIVE IMPEDANCE AMPLIFIER, STABLE IN SHORT CIRCUIT, PARTICULARLY FOR TELEPHONE SYSTEMS

Filed June 6, 1966 2 Sheets-Sheet 1

Cesare Valfrè
INVENTOR.

BY Clario Ceccon, agt

Cesare Valfre'
INVENTOR.

BY Mario Cacciu, agt.

3,503,002
Patented Mar. 24, 1970

1

3,503,002

TRANSISTOR NEGATIVE IMPEDANCE AMPLIFIER, STABLE IN SHORT CIRCUIT, PARTICULARLY FOR TELEPHONE SYSTEMS

Cesare Valfré, % A.E.T., Via Gianfrancesco, Re 47, Turin, Italy

Filed June 6, 1966, Ser. No. 555,297
Claims priority, application Italy, July 5, 1965, 13,074/65
Int. Cl. H03f *15/00*
U.S. Cl. 330—61 6 Claims

ABSTRACT OF THE DISCLOSURE

A transistor amplifier including input and output transformers, a pair of transistors in push-pull relationship in which means are provided for stabilizing the characteristics of the amplifier by polarizing the voltage of the bases of the transistors with respect to their associated emitters, means to reduce the attenuation of the amplifier in the absence of an input voltage by being connected in circuit relationship with the collector circuits, means in said transformers to eliminate saturation phenomena, means connected in parallel with one of the transformer windings for eliminating low frequency oscillations, and diode means in the collector circuits for limiting the maximum voltages induced on the transistors.

Figure 1:
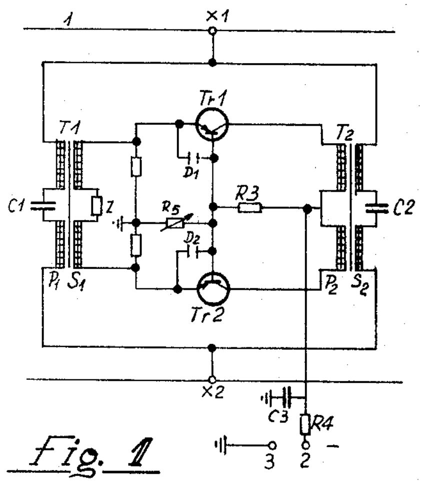

The present invention concerns a transistor negative impedance amplifier, stable in short circuit, particularly for telephone systems.

In many branches of the art and especially in telephony, amplifiers are employed arranged in parallel on the transmission line and suitably used as permanent terminal amplifiers. They consist essentially of one three-winding transformer or two two-winding transformers, at least one transistor and an equalization network.

When the direction of the windings of said transformers is conveniently selected, it is possible to obtain the output current in push-pull with the input current. Preferably, in these amplifiers there are provided two transistors in push-pull relationship, the emitters of which are connected in series to one of the windings of the aforementioned transformers and to the equalization impedance, and the collectors are connected in series to one other of the windings, while the bases are mutually connected, and the remaining windings are shunted to the line and have a blocking condenser of the cell signal placed in series.

An object of the present invention is to provide improvements to the amplifiers of this type capable of improving their operation, and of obtaining especially the following advantages:

(a) A greater stability of the amplifier's characteristics when the temperatures varies;

(b) A limitation in the maximum voltages induced on the transistors by the call signals;

(c) A reduction in the amplifier's attenuation when this is not fed;

(d) The elimination of the danger of setting up low-frequency oscillations; and (e) The elimination of the saturation phenomena of the transformers and of the noises caused during the phone conversation when signal voltages pass on the line.

To achieve the first of the above-listed advantages, that is, to greater stability against temperature variations, the invention provides for the polarization voltage of the bases of the transistors with respect to the emitters. This is obtained by a bipole formed by rectifiers and resistances, through which passes a current originating from the input voltage through a resistance.

2

To limit the maximum collector voltage induced on the transistors from the call signals two Zener diodes are inserted in series between the collectors of the two transistors, or two diodes are inserted in push-pull relationship between the collectors of the two transistors, connecting (through a Zener diode) the common point of said diodes to a terminal of the input.

In order to reduce the amplifier attenuation when said amplifier is not being fed, rectifiers are inserted in series with the collector circuit.

To avoid the danger of setting up low frequency oscillations, a resistance is inserted in parallel with one of the windings.

Finally, the elimination of the saturation phenomena corresponding to the passage on the line of signal voltages during a phone conversation is obtained by providing the transformers cores with an air gap.

For a better understanding of the present invention reference is made to the accompanying drawings, wherein:

FIGURE 1 shows a preferred embodiment of the amplifier of the invention comprising two transformers and two transistors in push-pull relation with each other; and FIGURES 2, 3, 4, 5, 6, 7 and 8 show variants of the preferred embodiment of FIGURE 1.

With reference to FIGURE 1, the amplifier circuit comprises two terminals $X_1$, $X_2$ connected to the line 1, between which are inserted the primary winding $P_1$ of a transformer $T_1$ and the winding $S_2$ of a second transformer $T_2$.

Two condensers $C_1$, $C_2$ are placed on the center of the two line windings $P_1$ and $S_2$, respectively, in order to avoid the short circuit of the call signal.

The terminals of the secondary $S_1$ of the transformer $T_1$ abut the emitters of the two transistors $Tr_1$, $Tr_2$ and the equalization impedance Z, while the collectors of $Tr_1$, $Tr_2$ are connected to the terminals of the winding $P_2$ of the transformer $T_2$.

The direct feed voltage is applied between the terminals 2 and 3 and by means of a filter cell formed by a resistance $R_4$. A condenser $C_3$ feeds the circuit formed by the transistors $Tr_1$ and $Tr_2$, the resistances $R_1$, $R_2$, $R_3$ and $R_5$ and the condenser $C_4$.

Furthermore, the diodes $D_1$ and $D_2$ are placed between the base and the emitter of the transistors $Tr_1$ and $Tr_2$ to limit the voltages induced by the call on the base-emitter junction of every transistor.

Figure 2:
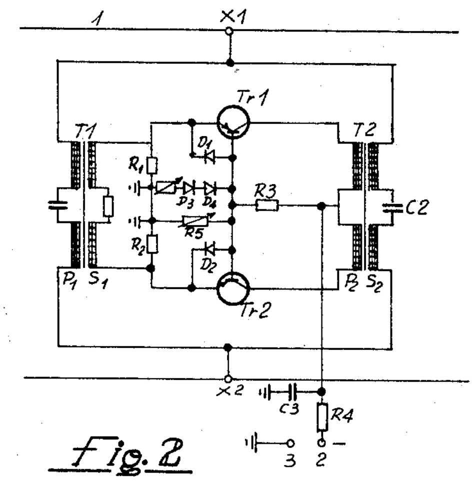

In the variant embodiment of FIGURE 2, two diodes $D_3$ and $D_4$ are inserted in parallel with the resistance $R_5$ and a resistance $R_6$ in series with them.

In another embodiment of the invention (FIGURE 3), two Zener diodes $Z_1$ and $Z_2$ opposite to each other are connected between the collectors of the two transistors.

In a further embodiment of the invention (FIGURE 4), two opposite diodes $D_5$ and $D_6$ are connected between the two collectors and the common point of said diodes is connected to an end of the resistance $R_4$ through a Zener diode $Z_3$.

In still another embodiment (FIGURE 5), two diodes $D_7$ and $D_8$, opposite to each other, are connected between the two collectors of the transistors $Tr_1$ and $Tr_2$ grounding the common point of said diodes through a Zener diode $Z_4$. Still in a further embodiment of the invention (FIGURE 6), two diodes $D_9$ and $D_{10}$ are connected in series with the collectors of the two transistors $Tr_1$ and $Tr_2$.

In a further embodiment (FIGURE 7), a diode $D_{11}$ is connected between the central point of the winding $P_2$ and a terminal of the resistance $R_4$.

Finally, in another embodiment (FIGURE 8) of the amplifier of the present invention, a resistance $R_7$ is connected in parallel with a winding $S_2$ section.

The operation of the hereabove described amplifier is as follows:

The line voltage $V_1$, applied between the terminals X, $X_2$ of the amplifier, causes a current $I_1$ to flow in the primary $P_1$ of the transformer $T_1$, and as a result a voltage $V_2$ rises at the ends of the secondary $S_1$.

Since the impedance Z is of a value considerably greater than the sum of the input impedances of the transistors $Tr_1$ and $Tr_2$, the voltage $V_2$ generates an alternate current of the emitter equal to $V_2/Z$.

Since $\alpha$ is the ratio between the output and input current of the transistors, the collector current is:

$$Ic=V_2/Z$$

This current, passing through the primary $P_2$ of the transformer $T_2$ causes a current $I_4$ on the secondary $S_2$ of the transformer $T_2$.

The entire current absorbed by the amplifier is obtained by the addition of the currents $I_1$ and $I_4$.

By suitably selecting the direction of connection and the number of winding turns, it is possible to have the current $I_4$ of a phase opposite to that of the current $I_1$ and of a considerably greater modulus, so that the resulting current is practically in phase opposition to the voltage $V_1$.

It is clear that, in these conditions, the amplifier acts as a negative impedance.

The winding turns ratio of the transformer $T_2$ is determined by the maximum voltage $V_1$ that it is assumed to be applied to the collector.

In fact, in the collector circuit, the voltage $V_1$ will not produce a voltage having an amplitude greater than the direct voltage applied to the two collectors.

The values of Z and of the turns ratio of $T_1$ must be fixed in such a way that the amplifier under the maximum applied voltage gives the maximum power required, bearing in mind, however, that the alternating current in the emitter circuit must not have an amplitude greater than the direct current of polarization; that the positive component of the amplifier admittance has to be considerably lower than the negative one; and that the impedance Z must not have a value too low so as to be resultingly greater than the input resistance of the two transistors and so as not to require the use of condensers of exceedingly high capacity.

The amplifier, according to the invention, is very linear, because the emitter current is practically determined solely by the impedance Z; moreover, the amplifier has great stability, due to the fact that its negative impedance depends practically solely on the parameter showing the ratio between the output current of the collector (short-circuited on the base) and the emitter input current, in the modern transistors said parameter depending only slightly on both the working point and the temperature.

The arrangement shown in FIGURE 2 of the drawings, in which the polarization voltage of the bases (as to the emitters) is taken from the ends of the bipole formed by the resistance $R_6$ and the diodes $D_3$ and $D_4$ in series with each other, through which passes the feed current, by suitably adjusting the diodes characteristics and the resistances values, allows the stabilization of the current absorbed by the amplifier when the temperature varies.

Moreover, the same illustrative arrangement allows the reduction of the current absorbed by the amplifier and the increase of its output power.

Figure 3:
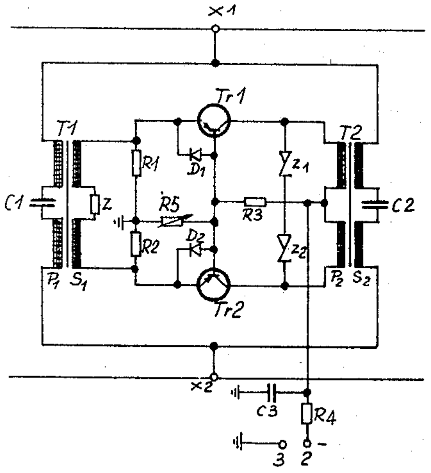

The connection diagram shown in FIGURE 3, allows the limitation of the collector maximum induced voltage on the transistors caused by the call signals.

In fact, the maximum potential difference existing between the two collectors can at best be equal to the opposite voltage of one of the two Zener diodes $Z_1$, $Z_2$. Therefore, the voltage of every collector is limited to the value approximately given by the sum of the direct voltage of the other collector and of the opposite voltage of one of the Zener diodes.

Figure 4:
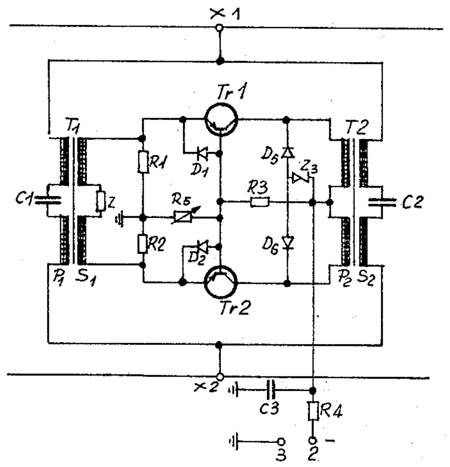
Figure 5:
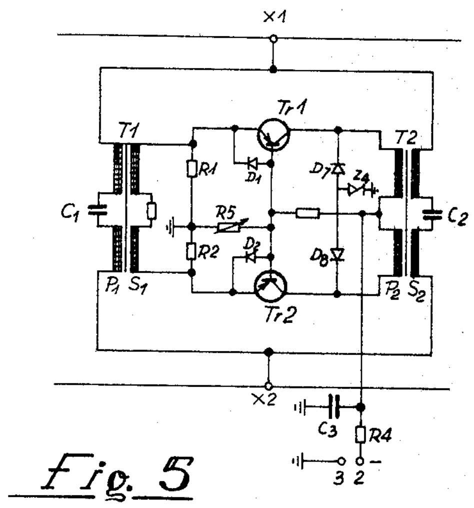

The diagrams of FIGURES 4 and 5 show two similar circuitry arrangements suitable to limit the maximum collector voltage as a result of the call transmission.

With reference to FIGURE 4, it is to be remarked that, if the voltage of one of the two collectors is above the value given by the addition of the feed voltage and the Zener diode opposite voltage, a large current absorption appears through the diode connected to the collector which practically prevents the appearance of further voltage rises.

In FIGURE 5 it can be observed that, having the Zener diode terminal grounded, the aforesaid limitation phenomenon occurs on the contrary for a collector voltage equal to the opposite voltage of the Zener diode $Z_4$.

Figure 6:
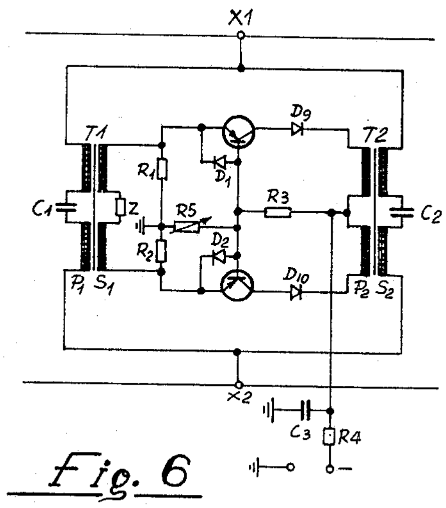
Figure 7:
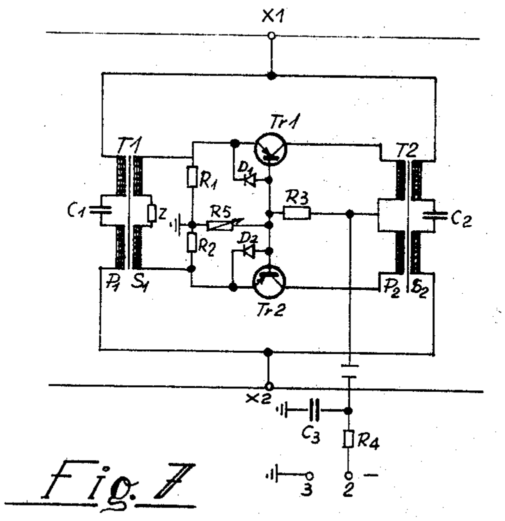
Figure 8:
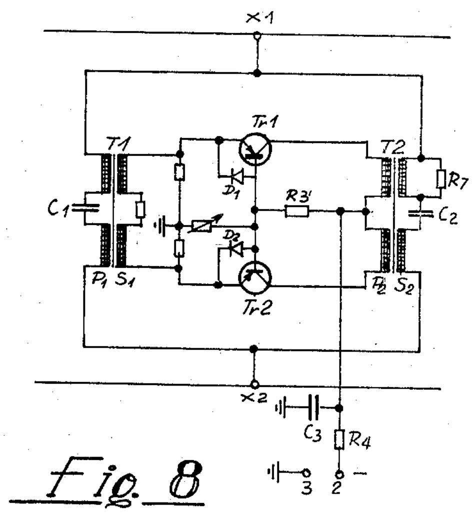

The diagrams of FIGURES 6 and 7 show two similar arrangements which are suitable for reducing the attenuation of the amplifier in the absence of feed.

This may be obtained in the circuit diagram shown in FIGURE 7 by inserting a high fall voltage diode $D_{11}$ in the collector circuit specifically in that part of the circuit which is common to the two transistors $Tr_1$, $Tr_2$.

Conversely, in the connection diagram of FIGURE 6, two diodes $D_9$ and $D_{10}$, respectively, are inserted in series with the collectors of the transistors $Tr_1$ and $Tr_2$. These high fall voltage diodes, for example silicon diodes, form a very high impedance when a voltage lower than the fall voltage is applied to them.

Therefore, when the amplifier is off, the impedance for the conversation currents flowing in the winding $P_2$ of the transformer $T_2$ is far greater than that for said currents when the amplifier operates normally.

The result is a remarkable reduction in the attenuation, due to the presence on the line of the unfed amplifier.

To avoid the possible setting up of low frequency oscillations (see the diagram of the circuit of FIGURE 8), a resistance $R_7$ is inserted in parallel with at least one of the windings of one of the transformers.

This resistance, being placed in parallel with the reactive element which can be affected by a possible setting up of oscillations, acts as a power dissipating element thus lessening quickly the uprising of these oscillations, particularly at low frequencies.

What is claimed is:

1. A transistor amplifier circuit for connection across telephone lines and adapted for connection to a source of D.C. voltage, said circuit comprising a first and second transformer, two common base connected transistors in push-pull circuit relationship, and an equalization impedance, said first and second transformers each having two primary and two secondary windings, the primary windings of said first transformer and the secondary windings of said second transformer being connected across said telephone lines, the secondary windings of said first transformer being serially connected between the emitters of said two push-pull connected transistors and said equalization impedance being serially connected between said two secondary windings of said first transformer, the primary windings of said second transformer being serially connected between the collectors of said two transistors, biasing means connected across the base-emitter junctions of said transistors to bias said junctions and to stabilize the characteristics of said amplifier, means for reducing the attenuation of said amplifier in the absence of an input signal, said attenuation reducing means being serially connected in the collector circuits of each transistor, a blocking capacitor serially connected between the two primary windings of said first transformer and between the two secondary windings of said second transformer, and diode means connected to the collectors of said transistors for limiting the maximum voltages developed at said collectors by a telephone call signal, the source of D.C. voltage being connected to the bases of said transistors.

2. The amplifier according to claim 1, in which said diode means comprises two Zener diodes in opposite orientation serially connected between the collectors of said two transistors.

3. The amplifier according to claim 1 in which said diode means comprises two diodes in opposite orientation serially connected between the collectors of said two transistors, and a Zener diode connected between the junction of said two diodes and ground.

4. The amplifier according to claim 1 in which said diode means comprises two diodes in opposite orientation serially connected between the collectors of said two transistors, and a Zener diode connected between the junction of said two diodes and said D.C. voltage source.

5. The amplifier according to claim 1 in which said attenuation reducing means comprises a diode serially connected to each collector of said two transistors.

6. The amplifier according to claim 1 in which said attenuation reducing means comprises a diode serially connected between the junction of the two primary windings of said second transformer and said D.C. voltage source.

References Cited

UNITED STATES PATENTS

| | | | |
|---|---|---|---|
| 2,691,075 | 10/1954 | Schwartz | 330—15 |
| 2,726,370 | 12/1955 | Linvill et al. | 330—15 X |
| 2,927,967 | 3/1960 | Edson | 330—15 X |

FOREIGN PATENTS

| | | | |
|---|---|---|---|
| 1,230,932 | 4/1960 | France. | |

NATHAN KAUFMAN, Primary Examiner

U.S. Cl. X.R.

330—119, 186